United States Patent
Suimon et al.

(10) Patent No.: US 7,397,155 B2
(45) Date of Patent: Jul. 8, 2008

(54) MOTOR, DRIVE UNIT AND ACTUATING DEVICE

(75) Inventors: Yoshio Suimon, Tokyo (JP); Yoshinobu Kaneko, Kawasaki (JP)

(73) Assignee: Tomy Company, Ltd., Tokyo (JP)

( * ) Notice: Subject to any disclaimer, the term of this patent is extended or adjusted under 35 U.S.C. 154(b) by 387 days.

(21) Appl. No.: 11/006,718

(22) Filed: Dec. 8, 2004

(65) Prior Publication Data

US 2005/0258695 A1   Nov. 24, 2005

(30) Foreign Application Priority Data

May 24, 2004  (JP)  ............... 2004-153435
May 25, 2004  (JP)  ............... 2004-154851

(51) Int. Cl.
*H02K 7/06* (2006.01)
(52) U.S. Cl. .......................... 310/83; 310/89
(58) Field of Classification Search ............ 310/156.32, 310/81, 83, 89, 49 R
See application file for complete search history.

(56) References Cited

U.S. PATENT DOCUMENTS

| 3,428,840 | A | * | 2/1969 | Kober | 310/114 |
| 3,873,865 | A | * | 3/1975 | Preiser et al. | 310/90 |
| 4,097,755 | A | * | 6/1978 | Kitai et al. | 310/114 |
| 4,149,116 | A | * | 4/1979 | Minakuchi | 388/820 |
| 4,922,162 | A | * | 5/1990 | Shiraki et al. | 310/268 |
| 5,514,923 | A | * | 5/1996 | Gossler et al. | 310/74 |
| 6,460,567 | B1 | * | 10/2002 | Hansen, III et al. | 137/554 |
| 6,605,883 | B2 | * | 8/2003 | Isozaki et al. | 310/49 R |

FOREIGN PATENT DOCUMENTS

| JP | 5-29280 | 4/1993 |
| JP | 6-83561 | 10/1994 |
| JP | 7-23598 | 1/1995 |
| JP | 7-274435 | 10/1995 |
| JP | 9-98563 | 4/1997 |
| JP | 9-266698 | 10/1997 |
| JP | 10-132964 | 5/1998 |
| JP | 3082740 | 10/2001 |
| JP | 2002-58282 | 2/2002 |
| JP | 2002-159199 | 5/2002 |

OTHER PUBLICATIONS

International Search Report for corresponding PCT/JP2004/018733 (English version).

\* cited by examiner

*Primary Examiner*—Dang D Le
(74) *Attorney, Agent, or Firm*—Staas & Halsey LLP

(57) ABSTRACT

A motor having: a rotor having a permanent magnet; and a stator having an air core coil, wherein a rotating magnetic field is formed between the permanent magnet and the air core coil by performing an energization control of the air core coil to rotate the rotor, a rotor shaft is made of one of a magnetic material and a nonmagnetic material, and a part or a portion to form the rotor excluding the permanent magnet and the rotor shaft is made of a nonmagnetic material.

13 Claims, 8 Drawing Sheets

MOTOR, DRIVE UNIT AND ACTUATING DEVICE

BACKGROUND OF THE INVENTION

1. Field of the Invention

The present invention relates to a motor, a drive unit and an actuating device.

2. Description of the Related Art

Earlier, a motor including a rotor and a pair of stators has been known, in which the rotor has a pair of permanent magnets which are laminated with a disk shaped magnetic material therebetween, a plurality of magnetic poles of each permanent magnet magnetized in an axis direction have different polarities alternately in a circumferential direction, the pair of permanent magnets is arranged such that the magnetic poles facing each other in the axis direction have different polarities, and each of a pair of stators includes a stator core of a magnetic thin plate having an inner ring and an outer ring and a magnetic coil (for example, see JP-Tokukouhei-6-83561B).

However, in the motor of the above described JP-Tokukouhei-6-83561B, a magnetic material such as iron or the like exists between the permanent magnets and the magnetic coil, so that a starting torque becomes extremely large. Thus, when a solar battery is used as a power source, one having large working current inevitably has to be used.

The present invention is accomplished in view of the problems, and an object of the present invention is to provide a motor with small starting torque, a drive unit incorporating the motor, and an actuating device incorporating the motor and the drive unit.

SUMMARY OF THE INVENTION

To solve the above problem, in accordance with the first aspect of the present invention, the motor includes:

a rotor having a permanent magnet; and a stator having an air core coil, wherein a rotating magnetic field is formed between the permanent magnet and the air core coil by performing an energization control of the air core coil to rotate the rotor, a rotor shaft is made of one of a magnetic material and a nonmagnetic material, and a part or a portion to form the rotor excluding the permanent magnet and the rotor shaft is made of a nonmagnetic material. The nonmagnetic material includes a material such as a gold, a copper or the like which shows diamagnetic behavior.

In this case, a plurality of permanent magnets may be arranged around the rotor shaft, or a ring shaped permanent magnet may be arranged to surround the rotor shaft. That is, the permanent magnet(s) is arranged such that the magnetic poles thereof have different polarities (north pole and south pole) alternately (preferably, at equal intervals) along the circumferential direction of the rotor shaft. Preferably, two or more air core coils are provided along the circumferential direction of the rotor shaft. The set position of each air core coil may be away from the permanent magnet in the axis direction of the rotor shaft or in the diameter direction of the rotor shaft. Further, each air core coil may be wound to have a round shape, an ellipse shape, a rectangular shape or the like as a whole, or may be wound along the circumferential direction of the rotor shaft to have an arch shape, an arcuate shape or the like as a whole, when seen from the permanent magnet side. When the permanent magnet faces the air core coil, it is not necessarily needed to make the center of the permanent magnet face the center of the air core coil. When arranging even numbers of air core coils, preferably, the air core coils are arranged to be symmetric with respect to the point of the center of the rotor shaft. In this case, the magnet poles of the permanent magnets facing each other across the rotor shaft as a center may have the same polarities or may have different polarities from each other. When the air core coils arranged to be symmetric with respect to the point of the center of the rotor shaft are alternately energized, the magnetic poles of the permanent magnets arranged to be symmetric with respect to the point of the center of the rotor shaft preferably have different polarities.

Moreover, when providing the permanent magnet on the rotor shaft, the permanent magnets may be directly attached to the rotor shaft, or may be indirectly attached to the rotor shaft through the magnet support portion. In the latter case, the magnet support portion is preferably made of nonmagnetic material. The rotor shaft is not necessary made of nonmagnetic material, and may be made of magnetic material (for example, metal). The rotor shaft would cause little effect to the rotating magnetic field produced between the permanent magnet and the air core coil, because the rotor shaft is arranged at the center of the rotor and rotates together with the rotor.

Further, when setting the motor, all parts or portions (peripheral parts or peripheral portions) in the area, in which the rotating magnetic field produced between the permanent magnet and the air core coil would be affected if a magnetic material were put closer to the motor, are preferably made of nonmagnetic material. For example, all the parts or the portions arranged in the area, in which the rotating magnetic field produced between the permanent magnet and the air core coil would be affected if a magnetic material were put closer to the motor and thereby stopping the rotation of the motor, are made of nonmagnetic material. Such area can be easily confirmed by an experiment or the like.

Preferably, the motor of the first aspect of the present invention further includes a solar battery as a power source. In this case, preferably, the energization control of the air core coil is performed by the oscillation circuit (for example, a multivibrator, and especially an astable multivibrator).

Moreover, preferably, the rotor is light in weight for reducing the rotation resistance as much as possible. Thus, preferably, the rotor shaft is as thin as possible for saving weight. When providing the magnet support portion, it is preferably light in weight by considering the shape and the material thereof. Further, preferably, the end portion of the rotor shaft is rounded or sharpened and contacts with the metal pivot to be supported by it, thereby reducing the rotation resistance.

In the first aspect of the present invention, four permanent magnets may be arranged to make magnetic poles of the permanent magnets to have different polarities alternately at equal intervals along the circumferential direction of the rotor shaft, and two air core coils may be provided with equal intervals along the circumferential direction of the rotor shaft.

In accordance with the second aspect of the present invention, the drive unit includes:

the motor of the first aspect of the present invention, provided in a casing, wherein a part or a portion, which would affect a rotating magnetic field produced between the permanent magnet and the air core coil, if the part or the portion were made of a magnetic material, is made of a nonmagnetic material.

The term "part" is used to include the casing itself, and is also used to indicate a part other than the motor when the part other than the motor is incorporated into the casing. The term "part" also includes a portion of the part. Accordingly, there may be a case where some parts forming the drive unit are made of nonmagnetic material, or a portion of these some parts is made of nonmagnetic material. Preferably, the casing and the part other than the motor provided in the casing are all made of nonmagnetic material. In this case, preferably, the casing is formed to cover the area in which the rotating magnetic field produced between the permanent magnet and the air core coil affects. That is, even when a magnetic material is put at an arbitrary position outside the casing, the casing preferably has a size and a shape to prevent the rotating magnetic field produced between the permanent magnet and the air core coil from being substantially diminished.

In the second aspect of the present invention, the drive unit includes:

the motor of the first aspect of the present invention, provided in a casing; and a power transmission mechanism to transmit a rotation power to the motor, provided in the casing, wherein a part or a portion, which would affect a rotating magnetic field produced between the permanent magnet and the air core coil, if the part or the portion were made of a magnetic material, is made of a nonmagnetic material.

The term "part" is used as a concept to include the casing itself or a working part, and is also used as a concept to include a part other than the motor or the working part when the part other than the motor or the working part is incorporated into the casing. The term "part" also includes a portion of the part. Accordingly, there may be a case where some parts forming the drive unit are made of nonmagnetic material, or a portion of these some parts is made of nonmagnetic material. Preferably, the casing and the parts provided in the casing are all made of nonmagnetic material. In this case, preferably, the casing is formed to cover the area in which the rotating magnetic field produced between the permanent magnet and the air core coil affects. That is, even when a magnetic material is put at an arbitrary position outside the casing, preferably, the casing has a size and a shape to prevent the rotating magnetic field produced between the permanent magnet and the air core coil from being substantially diminished.

In accordance with the third aspect of the present invention, the actuating device includes:

the motor of the first aspect of the present invention, wherein a part or a portion, which would affect a rotating magnetic field produced between the permanent magnet and the air core coil, if the part or the portion were made of a magnetic material, is made of a nonmagnetic material.

The term "part" represents a part forming the actuating device other than the motor.

In the third aspect of the present invention, the actuating device includes:

the drive unit of the second aspect of the present invention, wherein a part or a portion, which would affect a rotating magnetic field produced between the permanent magnet and the air core coil, if the part or the portion were made of a magnetic material, is made of a nonmagnetic material.

The term "part" represents a part forming the actuating device other than the motor.

According to one of the first to third aspects of the present invention, the rotor shaft is made of magnetic material or nonmagnetic material, the parts forming the rotor excluding the permanent magnet and the rotor shaft are made of nonmagnetic material, so that the rotor can be rotated even by an extremely small working current. An IC may be used as an energization control section. However, when an oscillation circuit, especially an astable multivibrator, is used, the rotor is rotated even by a small working current, which is advantageous in comparison with the case of using the IC. When a solar battery is used as a power source, it is not needed to use a dry cell or the like, enabling to realize energy saving.

BRIEF DESCRIPTION OF THE DRAWINGS

The present invention will become more fully understood from the detailed description given hereinafter and the accompanying drawings which are given by way of illustration only, and thus are not intended as a definition of the limits of the present invention, and wherein;

FIGS. 2A to 2C are views showing an inside structure of a casing of the actuating device according to the present invention, wherein FIG. 2A is a sectional view along the line A-A of FIG. 2B showing a state where a side frame is removed, FIG. 2B is a plan view showing a state where a top plate is removed, and FIG. 2C is a sectional view showing an attachment structure of a rotor shaft;

FIGS. 4A and 4B are views showing structures of a rotor of the actuating device according to the present invention, wherein FIG. 4A is a sectional view showing a main portion of the rotor, and FIG. 4B is a bottom view of the rotor;

DETAILED DESCRIPTION OF THE PREFERRED EMBODIMENTS

Figure 1:
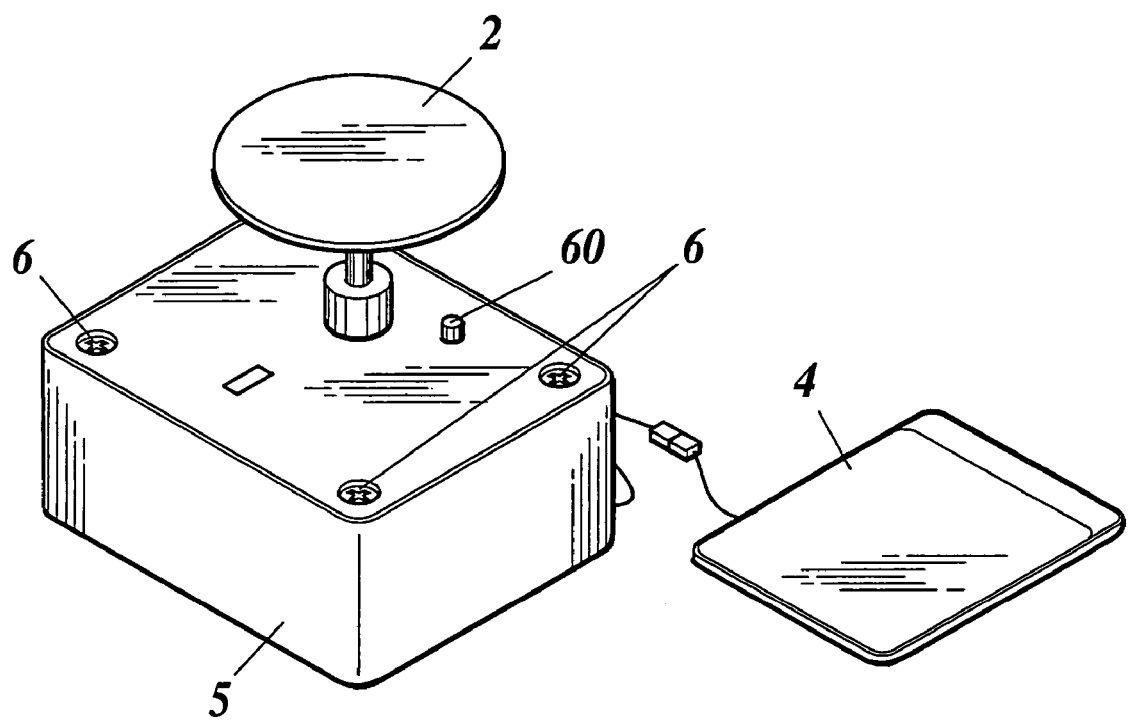
FIG. 1 is a perspective view of an actuating device according to the present invention.

The embodiments of the present invention will be explained below referring to the drawings.

FIG. 1 shows an actuating device. The actuating device 1 includes a disk shaped table 2 as a final actuated part for placing goods such as a mobile phone or the like thereon and is used for displaying the goods by rotating the table 2. The "final actuated part" represents a part which is finally actuated by a motor. The actuating device 1 includes the table 2, a drive unit 3 (refer to FIG. 2A), and a solar battery 4. The drive unit 3 is incorporated in a casing 5. The casing 5 is made of synthetic resin which is nonmagnetic material (for example, ABS resin (acrylonitrile-butadiene-styrene copolymer resin)).

Figure 2A:
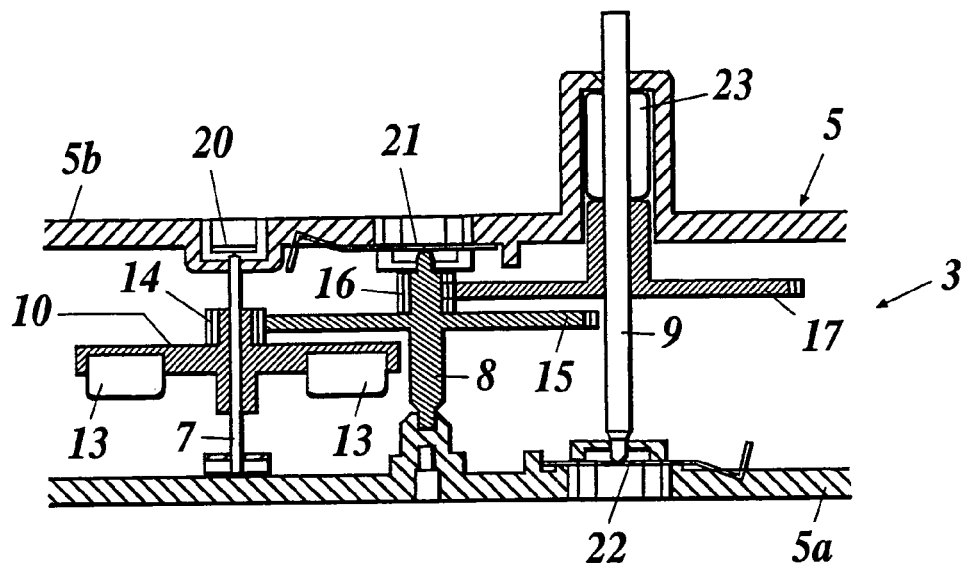
Figure 2B:
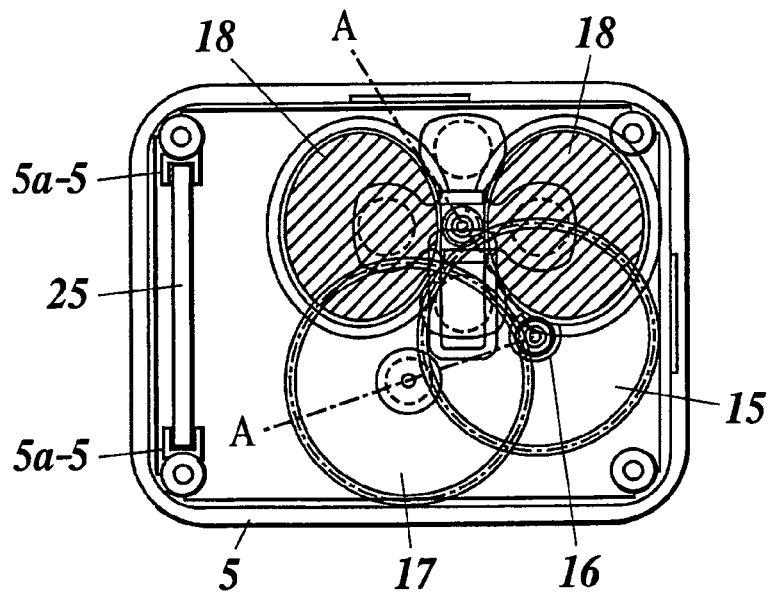
Figure 2C:
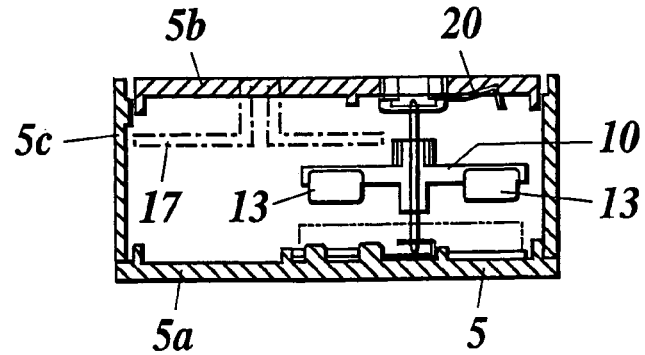
Figure 3:
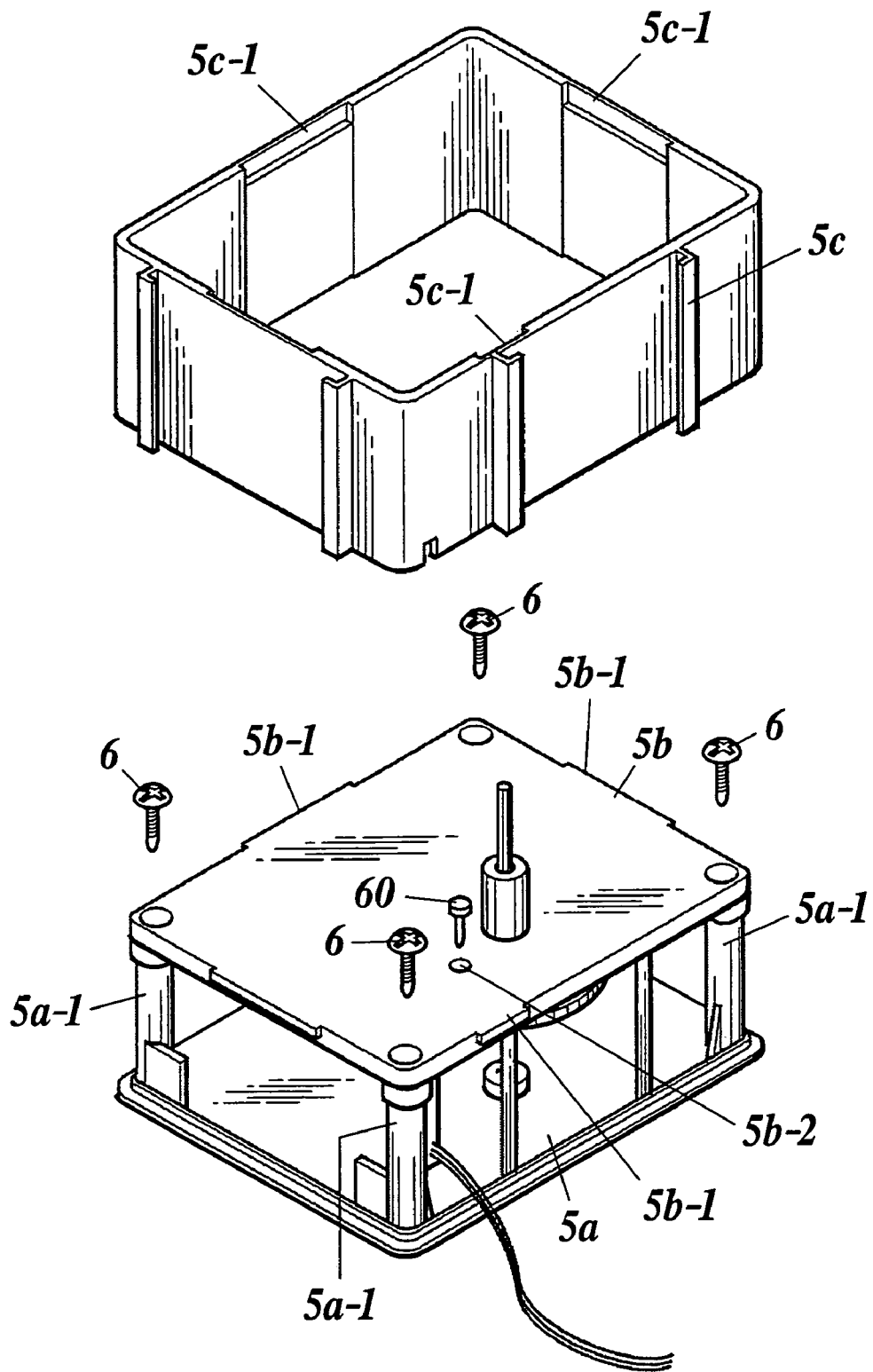
FIG. 3 is a perspective view showing the structure of the casing of the actuating device according to the present invention.

FIGS. 2A to 2C show the inside of the casing 5. FIG. 2A is a sectional view along the line A-A of FIG. 2B. As shown in FIG. 3, the casing 5 includes a rectangular shaped bottom plate 5a and top plate 5b, and a side frame 5c which closes the space formed by assembling the bottom plate 5a and the top plate 5b with each other with a predetermined clearance.

Shafts 7, 8 and 9 extend between the bottom plate 5a and the top plate 5b. The shafts 7, 8 and 9 are temporarily placed at predetermined positions of the bottom plate 5a, the top plate 5b is placed on bosses 5a-1 of the bottom plate 5a, and in this state, positioning of the shafts 7, 8 and 9 is performed by using a tool made of nonmagnetic material inserted from the space between the bottom plate 5a and the top plate 5b. Then, the bottom plate 5a and the top plate 5b are assembled with each other with screws 6 to set the shafts 7, 8 and 9. In this case, the screws 6 are preferably made of nonmagnetic material (for example, brass or synthetic resin). The side frame 5c is fit onto the assembly of the bottom plate 5a and the top plate 5b from the top plate 5b side to form the casing 5.

The side frame 5c may be attached to the assembly with the screws made of nonmagnetic material. In this case, the attachment structure is preferably formed as follows.

That is, as shown in FIG. 3, claws 5b-1 having a triangular shape in vertical section are partially provided around the top plate 5b (preferably at a plurality of points), and recess portions 5c-1 having a triangular shape in vertical section engaging with the claws S5b-1 are provided at the side frame 5c corresponding to the positions of the claws 5b-1, respectively. Thus, the side frame 5c is set to fit onto the assembly from the top plate 5b side. When the side frame 5c is fit onto the assembly from the top plate 5b side, the claws 5b-1 engage with the recess portions 5c-1 and the side frame 5c does not move upward (from the top plate 5b side). The bottom plate 5a is formed to be slightly larger than the top plate 5b, so that the end of the side frame 5c contacts with the upper surface of the bottom plate 5a when the side frame 5c is fit onto the assembly from the top plate 5b side. Accordingly, the side frame 5c does not move downward. When replacing or repairing a component in the casing 5, after removing the top plate 5b from the bottom plate 5a by unscrewing the screws 6, the side frame 5c is adapted to be removed from the top plate 5a side. The above attachment structure is successful in easily performing assembling. It is to be understood that the top plate 5b may be formed slightly larger than the bottom plate 5a to have a structure which is opposite to the above described structure.

Figure 4A:
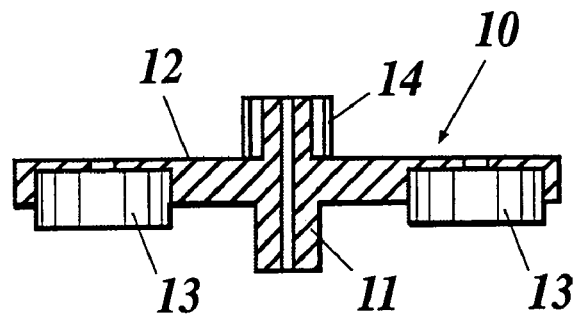
Figure 4B:
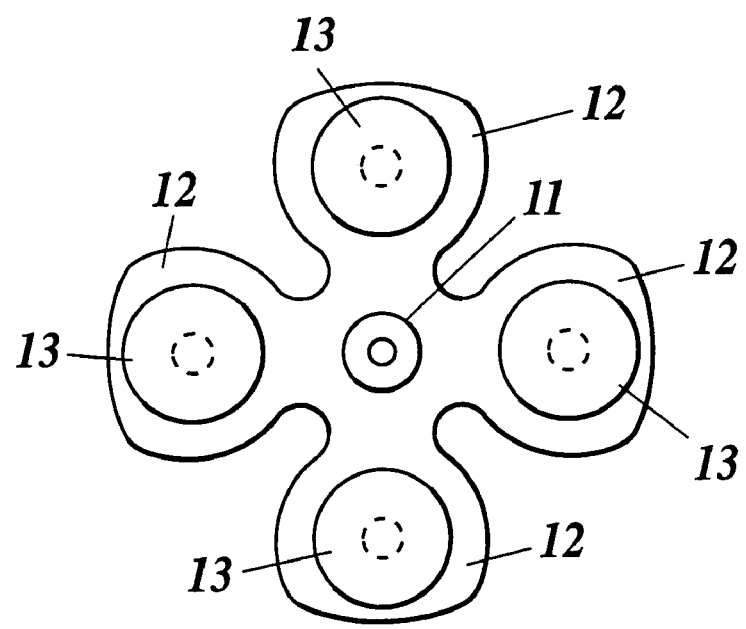

The shaft 7 is a rotor shaft made of SUS or brass which is nonmagnetic material. In this case, the shaft 7 is preferably made of nonmagnetic material, however, it may be made of magnetic material. Since the shaft 7 is arranged at the center of the rotor and is rotated with the rotor, even if the shaft 7 is made of magnetic material, it would cause little effect to the rotating magnetic field. Preferably, the shaft 7 is as thin as possible for saving weight. A magnet support member 10, which is made of synthetic resin of nonmagnetic material (for example, POM resin (polyacetal)), is attached to the shaft 7. As shown in FIGS. 4A and 4B, the magnet support member 10 includes a cylinder shaft 11 which fits onto the shaft 7, and four magnet support portions 12 which are formed to be integral with the cylinder shaft 11 and extend in a crisscross manner outward of the rotor shaft. FIG. 4B is a bottom view of the rotor. The magnet support portions 12 may extend concentrically, however, it is preferable that the magnet support portions 12 corresponding to the number of the magnets radially expand outward of the rotor for saving weight. Each magnet support portion 12 is provided with the permanent magnet 13 at the bottom surface thereof. In this case, the permanent magnets 13 are arranged such that the magnetic poles thereof have different polarities (north pole and south pole) at regular intervals alternately in a circumferential direction of the shaft 7. The cylinder shaft 11 is integrally provided with a small diameter gear 14. The small diameter gear 14 is made of synthetic resin which is nonmagnetic material (for example, POM resin (polyacetal)). Preferably, the small diameter gear 14 is also made of nonmagnetic material, however, it may be made of magnetic material. Since the small diameter gear 14 is arranged at the center of the rotor and is rotated with the rotor, even if the small diameter gear 14 is made of magnetic material, it would cause little effect to the rotating magnetic field.

Various magnets such as a barium ferrite magnet, a strontium ferrite magnet, a samarium magnet, a neodymium magnet and the like can be used as the permanent magnet 13, however, the samarium magnet or the neodymium magnet having a large maximum energy product is preferably used. The shaft 7 may be a square shaft, however, it is preferably a round shaft. Preferably, both end portions of the shaft 7 are inserted into circular holes, and each end portion of the shaft 7 is rounded or sharpened to be supported by a metal pivot 20 (for example, made of Cu) or the like in approximately a point contact condition, so that the movement in the axis direction can be suppressed and the rotating resistance can be reduced. Nonmagnetic material (paramagnetic material) includes a material (diamagnetic material) such as gold or copper which shows diamagnetic behavior. Diamagnetic material has a property which is opposite to that of ferromagnetic material, however, the effect thereof is extremely small. Thus, in classification, the diamagnetic material is included in the paramagnetic material. In the specification, the term of nonmagnetic material is used according to this classification.

Figure 5:
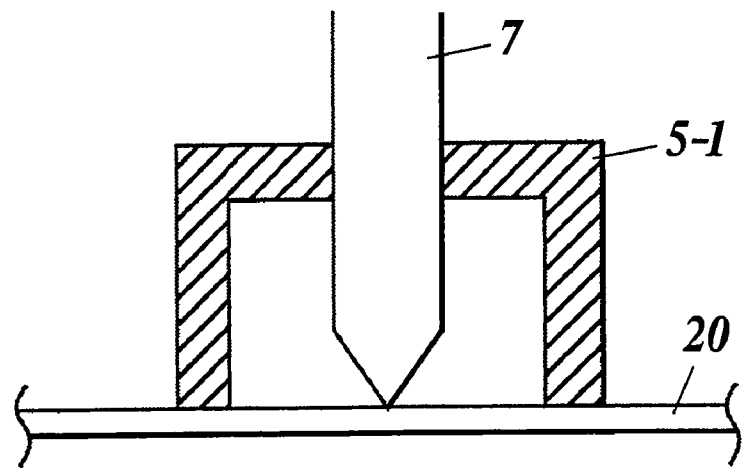
FIG. 5 is a view showing a specific example of a supporting structure of the rotor shaft of the actuating device according to the present invention.

FIG. 5 shows a specific example of the supporting structure of the shaft 7. In this supporting structure, a load in the axis direction is received at the metal pivot 20. That is, the metal pivot 20 functions as a thrust bearing. A support part 5-1 having a circular hole into which the end portion of the shaft 7 is inserted receives a load applied perpendicular to the shaft 7. That is, the support part 5-1 functions as a radial bearing. The thickness of the supporting part 5-1 is preferably set as small as possible for the following reason. In the embodiment, the actuating device 1 is used with the shaft 7 oriented in a vertical direction. However, the actuating device 1 may also be used with the shaft 7 oriented in a horizontal direction. In this case, the contact area of the supporting part 5-1 with the shaft 7 is reduced when the thickness of the supporting part 5-1 is small, thereby enabling to reduce the rotation resistance as small as possible. Preferably, the supporting structure of the other shafts 8 and 9 are same as that of the shaft 7.

As above, the rotor includes the shaft 7, the magnet support member 10 attached to the shaft 7 and the permanent magnets 13. The small diameter gear 14 forms a part of a power transmission mechanism.

The shaft 8 is made of synthetic resin which is nonmagnetic material (for example, POM resin (polyacetal)). The shaft 8 is integrally provided with a large diameter gear 15 and a small diameter gear 16. The large diameter gear 15 and the small diameter gear 16 are both made of synthetic resin which is nonmagnetic material (for example, POM resin (polyacetal)). The large diameter gear 15 engages with the small diameter gear 14.

The shaft 8 may be a square shaft, however, it is preferably a round shaft. Further, preferably, each end portion of the shaft 8 is rounded or sharpened to be supported by a metal pivot 21 (for example, made of Cu) or the like in approximately a point contact condition, so that the movement in the axis direction can be suppressed and the rotation resistance can be reduced.

Figure 6:
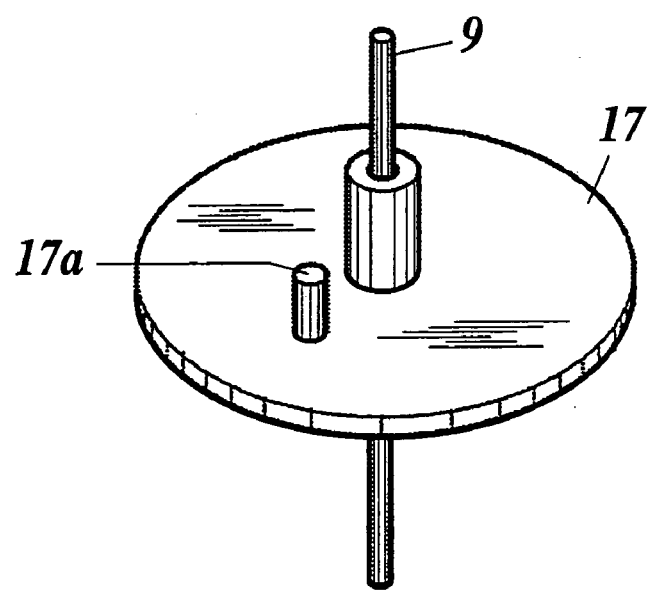
FIG. 6 is a perspective view showing a structure of one large diameter gear of the actuating device according to the present invention.

The shaft 9 is made of brass which is nonmagnetic material, and is provided with a large diameter gear 17. The large diameter gear 17 is made of synthetic resin which is nonmagnetic material (for example, POM resin (polyacetal)). There is attached a projection 17a as shown in FIG. 6 on the upper end surface of the large diameter gear 17. The large diameter gear 17 engages with the small diameter gear 16. The shaft 9 penetrates through the top plate 5b to extend upward of the top plate 5b.

The shaft 9 may be a square shaft, however, it is preferably a round shaft. Further, preferably, the lower end portion of the shaft 9 is rounded or sharpened to be supported by a metal pivot 22 (for example, made of Cu) or the like in approximately a point contact condition and a cylinder shaft 23 is fit onto the shaft 9, so that the movement in the axis direction can be suppressed and the rotation resistance can be reduced.

The disk shaped table 2 is detachably attached to the projecting portion of the shaft 9 projecting from the casing 5. The table 2 is made of synthetic resin which is nonmagnetic material (for example, ABS resin (acrylonitrile-butadiene-styrene copolymer resin)).

Further, there are two air core coils (stator) 18 provided in the casing 5. In the embodiment, each of the two air core coils 18 is a single winding coil, and the number of turns is about 800 to 2000. If the number of turns is less than 800, the working current is not enough to continuously rotate the table 2 (for example, the working current is about 60 μA). If the number of turns is more than about 2000, the air core coil becomes more expensive-mere than is necessary. Preferably, the number of turns is about 1400 to 1600. A control unit 19 performs the energization control of the two air core coils 18.

As shown in FIG. 3, an insertion hole 5b-2 is provided in the top plate 5b. A pin 60 is detachably inserted into the insertion hole 5b-2 as shown in FIG. 1. The pin 60 inserted into the insertion hole 5b-2 is arranged at a position to contact with the projection 17a with the rotation of the large diameter gear 17. When the pin 60 contacts with the projection 17a with the rotation of the large diameter gear 17, the rotation direction of the rotor and therefore the large diameter gear 17 changes. In the embodiment, the rotation direction of the rotor is determined according to the delicate magnetic balance acting between the two permanent magnets 13 and the two air core coils 18, so that when the pin 60 contacts the projection 17a as the large diameter gear 17 rotates and the rotation direction of the large diameter gear 17 therefore the rotor shaft is slightly reversed by the reaction force, the magnetic balance is broken and the large diameter gear 17 starts to rotate in the opposite direction.

Figure 7:
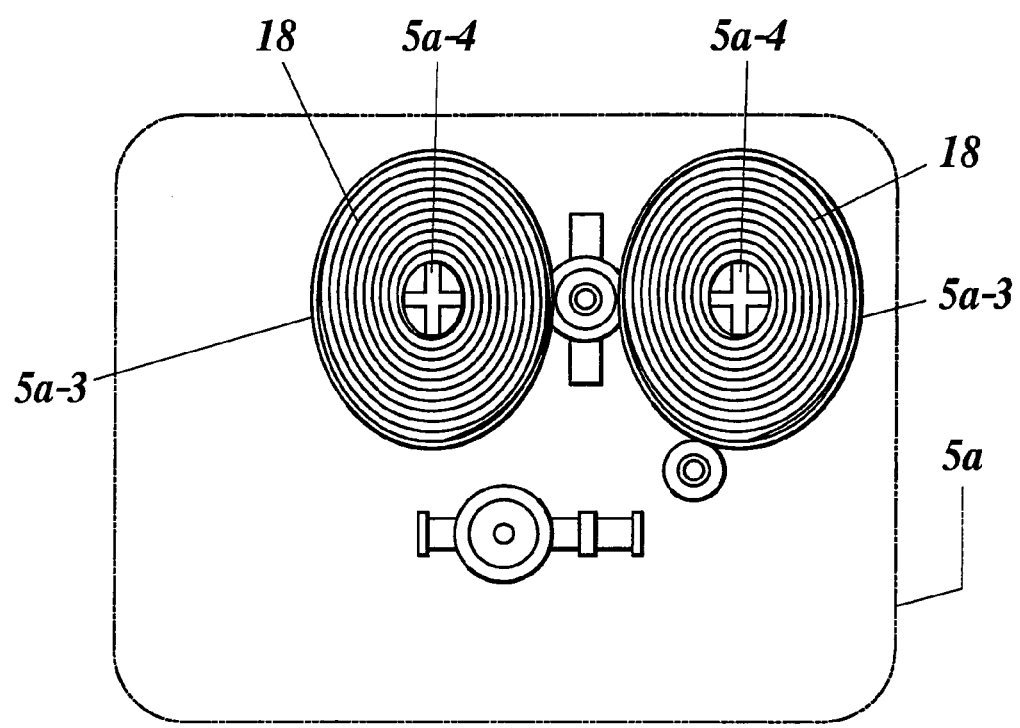
FIG. 7 is a plan view showing a structure of a bottom plate of the actuating device according to the present invention.

As shown in FIG. 7, the bottom plate 5a is provided with surrounding walls 5a-3 and crisscross projections 5a-4 for positioning the air core coils 18. The surrounding walls 5a-3 and the crisscross projections 5a-4 are made of nonmagnetic material. For example, the surrounding walls 5a-3 and crisscross projections 5a-4 made of nonmagnetic material are integrally formed with the bottom plate 5a. Each air core coil 18 is pushed into the surrounding wall 5a-3 in a state that the central hole of the air core coil 18 corresponds to the crisscross projection 5a-4, so that the air core coils 18 are set on the bottom plate 5a. In this case, it is not needed that each surrounding wall 5a-3 surrounds the entire circumference of the air core coil 18, and thus it may partially surround the air core coil 18.

Figure 8:
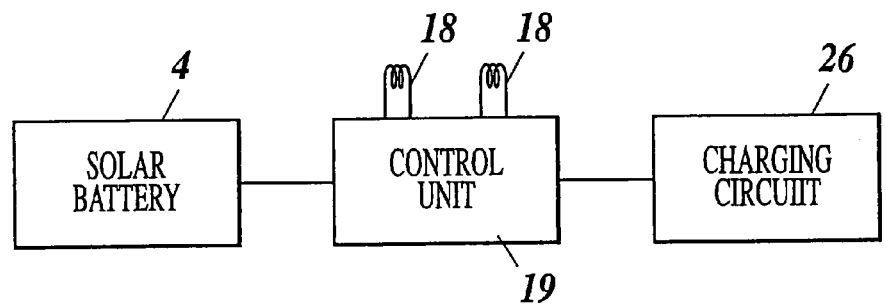
FIG. 8 is a circuit block diagram of the actuating device according to the present invention.
Figure 9:
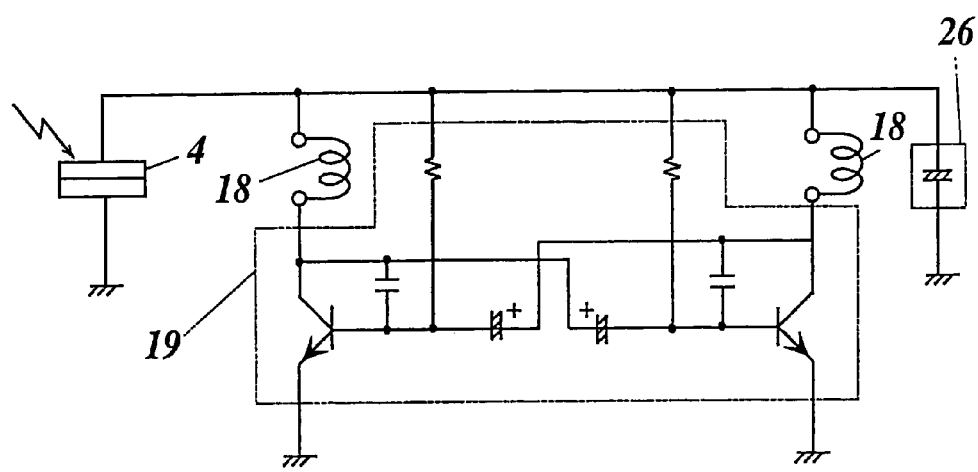
FIG. 9 is a circuit diagram of an oscillation circuit of the actuating device according to the present invention.

FIG. 8 shows a circuit block diagram including the control unit 19. In this case, the control unit 19 includes an oscillation circuit. Specific configuration of the oscillation circuit is shown in FIG. 9. An astable multivibrator is used as the oscillation circuit. The two air core coils 18 are alternately energized by the solar battery 4 as a power source. The control unit 19 is provided on a substrate 25 in the casing 5. As shown in FIG. 2B, the substrate 25 can be pulled out and inserted in U shaped engagement parts 5a-5 of the bottom plate 5a from above. In this figure, the reference numeral 26 indicates a charging circuit.

According to the actuating device 1 with the above structure, for example, an item such as a mobile phone or the like is placed on the disk shaped table 2 which is a final actuating part, and the table 2 rotates by, for example, setting the solar battery 4 under light source, thereby enabling the phone to rotate with the table 2.

Although the embodiments of the present invention were explained above, the present invention is not limited to these embodiments and various changes may be made without departing from the scope of the invention.

Figure 10:
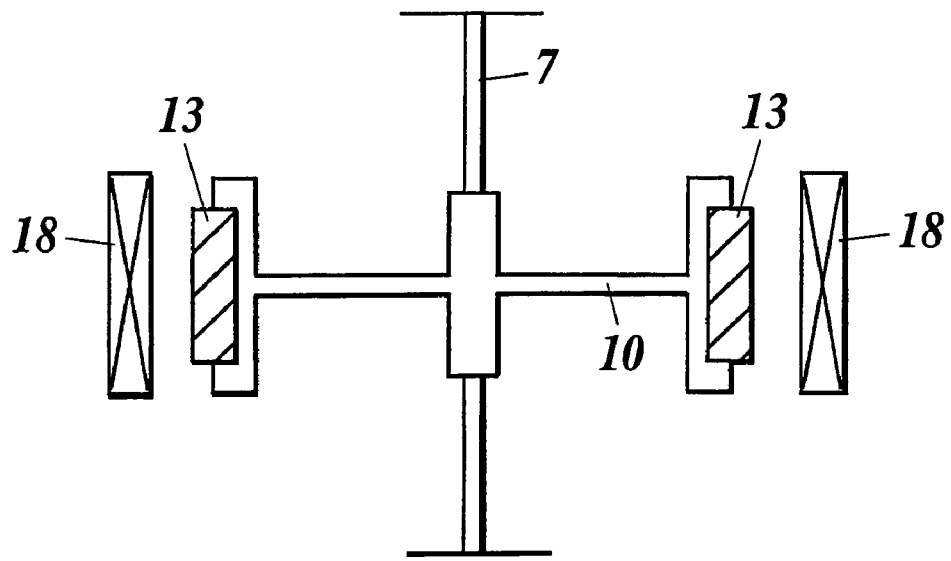
FIG. 10 is a view showing set positions of air core coils in a modified example of the actuating device according to the present invention.

For example, in the above embodiments, although the set positions of the air core coils 18 are away from the permanent magnets 13 in the axis direction of the shaft 7 (rotor shaft), the air core coils 18 may be arranged to be away from the permanent magnets 13 in the diameter direction of the shaft 7 (rotor shaft) as shown in FIG. 10.

Figure 11:
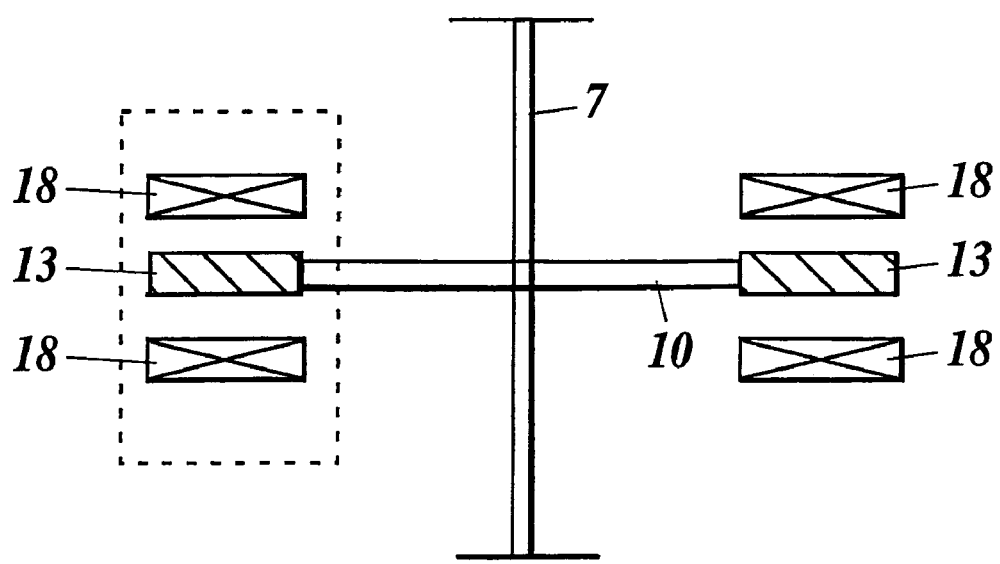
FIG. 11 is a view showing set positions of the air core coils in another modified example of the actuating device according to the present invention.

In the above embodiments although the set positions of the air core coils 18 are arranged to be away from the permanent magnets 13 in the axis direction of the shaft 7 (rotor shaft) on one surface side of the permanent magnets 13, the air core coils 18 may be arranged at positions to sandwich the permanent magnets 13 as shown in FIG. 11. There may be one pair of air core coils 18 sandwiching the permanent magnets 13.

In the above embodiments the explanation was made in the case where the rotor shaft is vertically placed (extending in the vertical direction), however, it is to be understood that the present invention is applied to the case where the rotor shaft is inverted or horizontally placed.

The entire disclosure of Japanese Patent Application Nos. Tokugan 2004-153435 which was filed on May 24, 2004, and Tokugan 2004-154851 which was filed on May 25, 2004, including specification, claims, drawings and summary are incorporated herein by reference in its entirety.

What is claimed is:

1. A drive unit comprising:
    a motor including one rotor having a plurality of permanent magnets, and a stator having an air core coil,
    wherein a rotating magnetic field is formed between the permanent magnets and the air core coil by performing an energization control of the air core coil to rotate the rotor on a rotor shaft;
    a power transmission mechanism to transmit a rotational force of the motor to a member, and
    a casing to receive the motor and the power transmission mechanism, and
    a solar battery as a power source for the motor,
    wherein the permanent magnets are arranged at equal intervals along the circumferential direction of the rotor shaft,
    wherein the air core coil is arranged with a central axis thereof being parallel to the rotor shaft, and a winding of the air core coil is spaced from and opposed to an end face of each of the permanent magnets, and
    wherein a part of the rotor, excluding the permanent magnets and the rotor shaft, and the power transmission mechanism and the casing are made of a nonmagnetic material.

2. The drive unit as claimed in claim 1, wherein the energization control of the air core coil is performed by an oscillation circuit.

3. The drive unit as claimed in claim 2, wherein the oscillation circuit includes an astable multivibrator.

4. The drive unit as claimed in claim 3, wherein the plurality of permanent magnets is four permanent magnets arranged to make magnetic poles of different polarities alternately at equal intervals along the circumferential direction of the rotor shaft, and the air core coil is two air core coils provided with equal intervals along the circumferential direction of the rotor shaft.

5. The drive unit as claimed in claim 1, wherein each of the permanent magnets includes any one of a barium ferrite magnet, a strontium ferrite magnet, a samarium magnet, and a neodymium magnet.

6. The drive unit as claimed in claim 1, wherein the rotor shaft is made of a nonmagnetic material.

7. The drive unit as claimed in claim 1, wherein the power transmission mechanism includes a gear with a rotational shaft which is rotated according to rotation of the rotor and which projects from an upper surface of the casing, and a table member which is attached to an upper end of the rotational shaft.

8. The drive unit as claimed in claim 7, wherein the table member receives a portable item thereon.

9. The drive unit as claimed in claim 7, wherein the power transmission mechanism includes a first rotational shaft which is rotated according to rotation of the rotor, and a second rotational shaft which is rotated according to rotation of the first rotational shaft, wherein the second rotational shaft projects from the upper surface of the casing.

10. The drive unit as claimed in claim 1, wherein a first projection is provided on the casing to project inside the casing and a second projection is provided on the power transmission mechanism at a position to contact with the first projection according to a movement of the power transmission mechanism, so that a rotation direction of the rotor changes by being out of magnetic balance acting between the permanent magnets and the air core coil, when the second projection contacts the first projection according to rotation of the rotor.

11. The driving unit as claimed in claim 1, wherein the rotor rotates in at least one direction on the rotor shaft according to magnetic balance acting between the permanent magnets and the air core coil.

12. The drive unit as claimed in claim 1, wherein the rotor shaft is rotatably supported in at least a lower end of the shaft by a point contact.

13. The drive unit as claimed in claim 1, wherein the rotor radially hangs over the rotor shaft in positions corresponding to the number of the plurality of permanent magnets.

* * * * *